APPARATUS FOR SHADOW PROJECTION OF CLOCK DIAL

Filed May 19, 1960 4 Sheets-Sheet 1

Inventor:
Charles A. Barrett,
by Munroe H. Hamilton
Attorney

June 9, 1964 C. A. BARRETT 3,136,210
APPARATUS FOR SHADOW PROJECTION OF CLOCK DIAL
Filed May 19, 1960 4 Sheets-Sheet 2
Fig. 5.
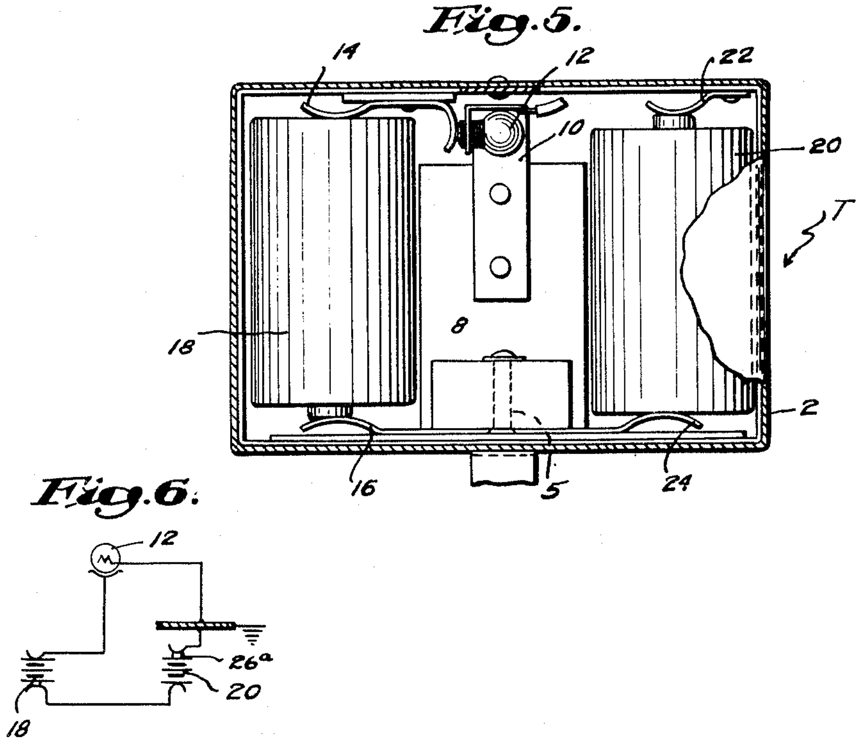
Fig. 6.
Fig. 11.
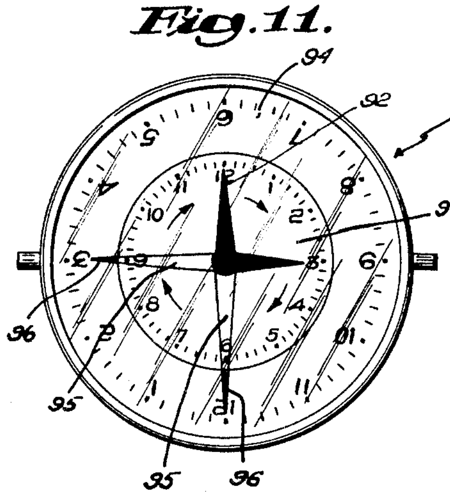
Fig. 12.
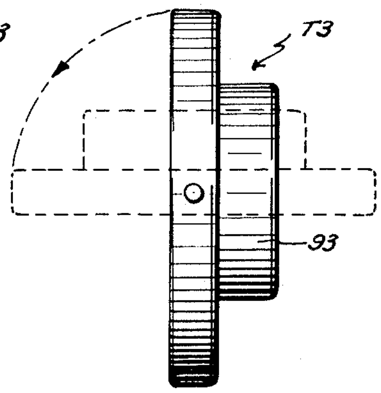
Inventor:
Charles A. Barrett,
by Marvin H. Hamilton
Attorney

APPARATUS FOR SHADOW PROJECTION OF CLOCK DIAL

Filed May 19, 1960 4 Sheets-Sheet 3

Inventor:
Charles A. Barrett,
by Munson H. Hamilton
Attorney

June 9, 1964 C. A. BARRETT 3,136,210

APPARATUS FOR SHADOW PROJECTION OF CLOCK DIAL

Filed May 19, 1960 4 Sheets-Sheet 4

Inventor:
Charles A. Barrett,
by Munroe H. Hamilton
Attorney

3,136,210 APPARATUS FOR SHADOW PROJECTION OF CLOCK DIAL

Charles A. Barrett, 1299 Massachusetts Ave., Lexington 73, Mass.

Filed May 19, 1960, Ser. No. 30,232
3 Claims. (Cl. 88—24)

This invention relates to improvements in instrument dial projectors for projecting an instrument dial image upon a ceiling, floor, wall or other suitable surfaces. In one specific aspect the invention is concerned with a transparent dial construction which may be combined with a clock movement and a source of light to provide a projected image for indicating time.

Various projecting devices have already been proposed in the art for projecting an image of a clock dial on a desired surface. However, in all these devices, so far as I am aware, the dial which is to be projected is always utilized in a reverse position, i.e., with the dial facing the source of light and hence the dial, when viewed from an opposite side, is not convenient to look at as a standard clock dial and is therefore somewhat impractical.

It is a chief object of the invention to provide an improved instrument dial projection, and to devise an instrument dial projector apparatus which may be employed interchangeably as a dial to be read in the conventional manner or as a means of projecting a dial reading on a suitable surface. Another object is to combine an interchangeable type of clock dial projector apparatus with various forms of supporting structures such as a bedside clock, a travelling clock, a flashlight, a clock radio, and the like.

Having in mind the limitations of conventional dial projectors, and also bearing in mind the objectives noted, I have conceived of a dual position dial projector means which may be used interchangeably in a position such that it may be read in a conventional manner or it may be rotated to project a dial image on a desired surface.

My concept of interchangeability is based on the observation that certain relationships exist between the location of clock dial figures on a transparent dial body and the particular axis of rotation through which a clock dial may be moved for interchangeable positioning. For example, where rotation is about an axis passing through the 12 o'clock position and the 6 o'clock position, a conventional dial may be located in a correct position to produce a projection of a clock reading.

In one preferred embodiment of interchangeable type projector, I combine a clock mechanism and light source with a special translucent dial which is arranged in concentric relationship around the clock mechanism to provide an annular dial portion through which light may be passed. The clock mechanism hands are constructed of a length to extend across the transparent annular portion and register with dial figures on the annular portion to thereby provide a time indicating unit. This time indicating unit is of a dual function nature and may be operated in two different positions. In one position the dial faces outwardly and presents a clock face which may be viewed and read in the customary manner. In the second position the dial is rotated so as to face the light surface and function as a light transmitting member to project its clock reading on a desired surface.

To provide for movement of the time indicating unit into one or the other of the positions noted, I combine therewith an enclosure body which contains the light source and also includes a special swiveled mounting for rotatably supporting the time indicating unit in a suitably inclined position. I further combine with the swiveled mounting and enclosure body electrical switch means for opening and closing a circuit through the light source in response to movement of the time indicating unit in its swiveled mounting.

These and other objects and novel features will be more fully understood and appreciated from the following description of a preferred embodiment of the invention selected for purposes of illustration and shown in the accompanying drawings, in which:

FIG. 5 is a plan cross sectional view taken on the line 5—5 of FIG. 4;

FIG. 6 is a diagrammatic view illustrating the electrical circuit means indicated in FIGS. 4 and 5;

FIGS. 11 and 12 illustrate a modified form of translucent dial and clock movement of the invention.

Figures 1, 2:
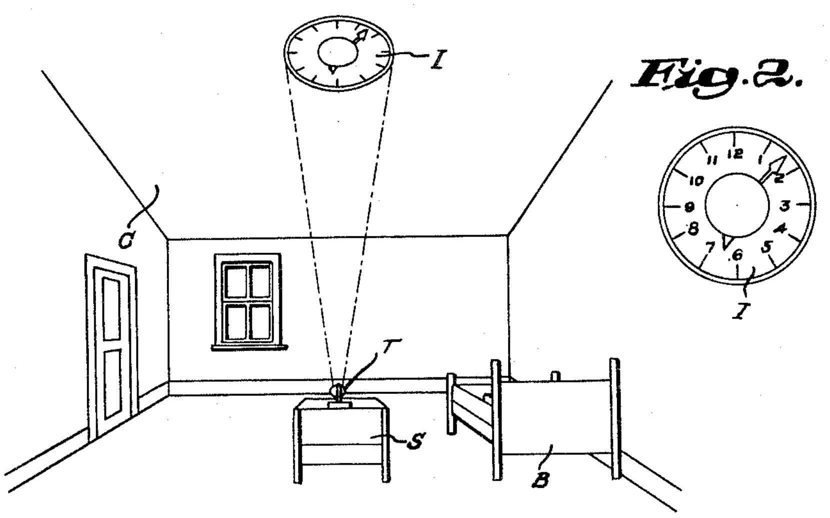
FIG. 1 is a diagrammatic view indicating a portion of a room with the projector apparatus of the invention illustrated in one typical operating position.
FIG. 2 is a detail elevational view illustrating a dial reading as projected in the manner suggested in FIG. 1.

Considering the projector components of the invention in greater detail, attention is directed to FIGS. 1–6 inclusive wherein I have illustrated one desirable form of the invention consisting of a bedside clock. In FIG. 1, I have illustrated a room having sidewalls and a ceiling C. B denotes a bed and S refers to a bedside stand. Located on the stand S is a time indicating unit T, and indicated diagrammatically on the ceiling C is an image of a clock reading projected from the unit 1 and better shown in FIG. 2. It will be apparent that the projected image is thus located in a position in which it may be conveniently observed by an occupant of the bed B, and that the occupant may, while lying in bed, readily reach out and control the operation of the unit T.

Figure 3:
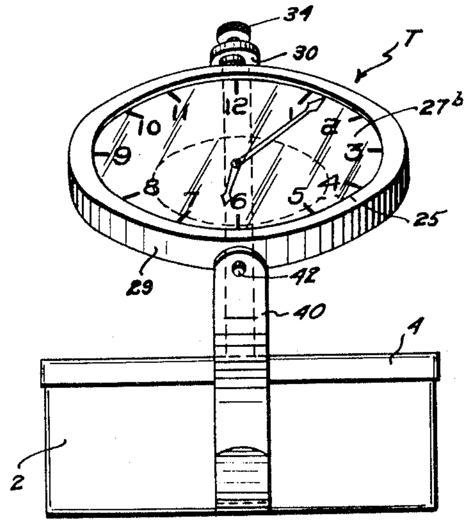
FIG. 3 is a front elevational view illustrating the projector and time indicating unit of the invention.

As shown in FIG. 3 the unit T includes a box shaped enclosure which is provided with a cover element 4 having an annular light transmitting apertrue 6. Secured inside the enclosure body 2, by screw 5, is a block 8 to which is secured a lamp supporting bracket 10.

A lamp or bulb 12 is detachably secured in a socket portion of the bracket 10 in a position such that its base engages a contact spring 14. Supported between the contact spring 14 and a second contact spring 16, is a battery 18 as shown in FIG. 5. Siimlarly, a second battery 20 is supported at the other side of block 8 between contact springs 22 and 24.

In accordance with the invention, I locate above the enclosure body 2, and the light source described, a clock movement 25 of conventional nature having hands as 25*a* and 25*b*. Secured to the clock movement in concentrically arranged relationship is a translucent dial 27 which presents an annular portion 27*a* extending beyond the opaque clock movement 25. The hands 25*a* and 25*b* are of extended length so as to project beyond the clock movement 25 and register with the dial figures on the annular dial portion 27a. The dial may be covered by a translucent cover 27b, which is secured within a bezel ring 29.

Figure 4:
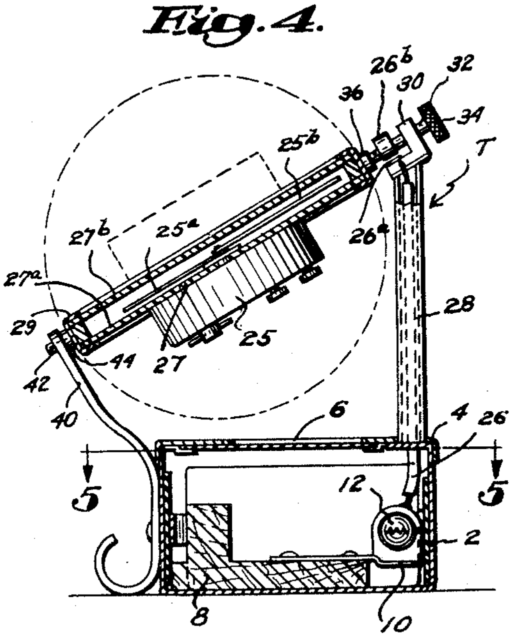
FIG. 4 is a vertical cross section showing details of construction of the projector apparatus indicated in FIG. 3, and more clearly indicating the swiveled mounting arrangement for the time indicating unit of the invention.

As shown in FIGS. 3 and 4, the clock movement 25, and the dial 27, are rotatably supported as a unit preferably in an inclined position such that the unit may be revolved or swiveled about an axis which passes approximately through the 12 o'clock position and the 6 o'clock position of dial 27 as may be seen from an inspection of FIG. 3. One suitable means for a swivel mounting of the type described is comprised by a tubular post 28 at the upper end of which is a bearing member 30 through which is rotatably received an operating pin 32 carrying a knurled head 34.

The extremity of pin 32 is fixed in a hub 36 in turn received through the bezel ring 29 as shown in FIG. 4. It will be observed that the longitudinal axis of operating pin 32 substantially coincides with the axis passing through the 12 o'clock and 6 o'clock position of the dial 27 as suggested in FIG. 3.

Secured at an opposite side of the enclosure body 2 is another relatively short supporting bracket 40 through the upper end of which is rotatably mounted a pin 42 fast to a hub 44 in an opposite side of the translucent dial bezel ring 29. As will be observed from an inspection of FIG. 4, the clock movement and dial structure are thus mounted in an inclined position such that the dial may be faced outwardly for conventional clock reading. However, when the unit is swiveled about its axis of rotation, through an arc of 180° by turning the knurled head 34 as suggested in dotted lines in FIG. 4, the dial may be caused to face the aperture 6 in the enclosure body. In this reversed position the annular portion 27a can transmit light from the lamp 12 when energized and project an image on a suitable surface such as ceiling C as shown in FIG. 1.

An important feature of the invention consists in the further provision of an electrical switch arrangement which is responsive to movement of the time unit T into the projecting position above described to close a circuit through the lamp 12 and thus provide for projecting an image at the desired point.

This electrical switch arrangement includes an electrical conductor 26 which is received through the tubular post 28 and connected to a switch contact 26a mounted in the bearing 30 as shown in FIG. 4. In the position shown the circuit to ground is open. However, a second such contact element 26b, fast on pin 32, is adapted in one position of rotation to engage with the contact 26a and completes a circuit through ground as suggested in the wiring diagram of FIG. 6, and the lamp is then energized. This position at which the members 26a and 26b make contact is adjusted to occur whenever the T unit is facing inwardly as suggested in dotted lines in FIG. 4 at the end of a rotative movement through an arc of 180°.

By means of the arrangement described the unit T will normally be supported on the stand S with the dial 27 facing outwardly to indicate a clock reading in the usual manner. However, assume the occupant of bed B wishes to learn the exact time during the hours when the room is in darkness, he merely reaches out and turns the knurled head 34 through an arc of 180° thus energizing the lamp 12 and projecting the image I on the ceiling. It is pointed out that the image will occur of relatively large size and therefore may be easily read even by those with faulty vision.

Figures 7, 8, 13, 14, 15, 16:
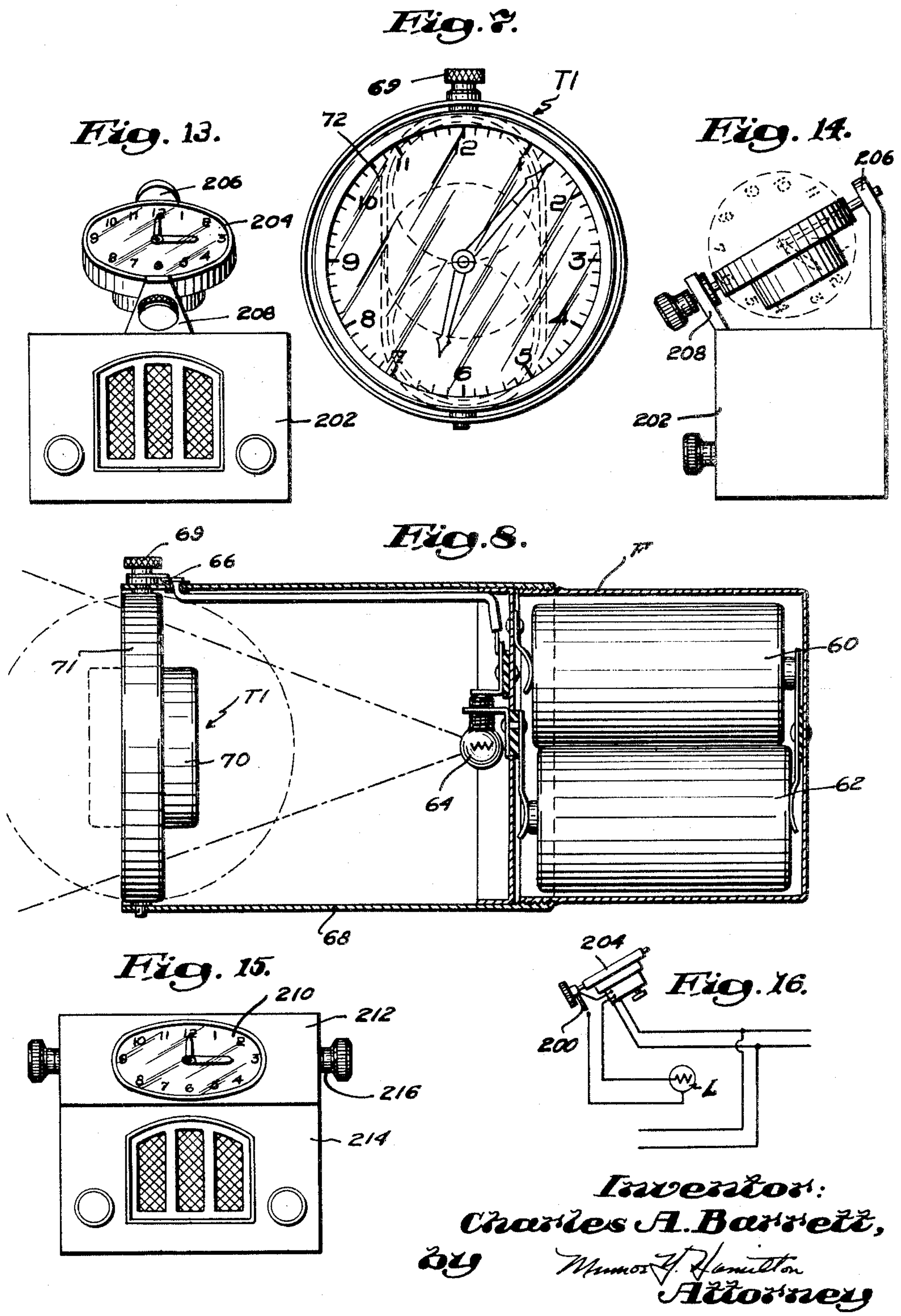
FIG. 7 is a front elevational view of a clock projector apparatus combined with a flashlight body.
FIG. 8 is a central cross section taken longitudinally of the flashlight assembly shown in FIG. 7.
FIGS. 13 to 16 inclusive illustrate a modification consisting of clock projector mechanism in combination with a radio.

I may also desire to combine my projector apparatus with other forms of enclosure bodies. For example, in FIGS. 7 and 8 I have illustrated a flashlight housing F having batteries 60 and 62 for energizing a lamp 64 through a switching arrangement 66 similar to that described. A time indicating unit T1 is rotatably mounted at the outer end of a cylindrical casing 68 as shown in FIG. 8, and the member T1 may be rotated by turning a knurled head 69. The unit T1 includes a clock movement 70 and a bezel ring 71 in which is supported a dial 72 as shown in FIG. 7. The use and operation of the dial 72 in general corresponds to that of the dial 27 already described above.

Figure 9:
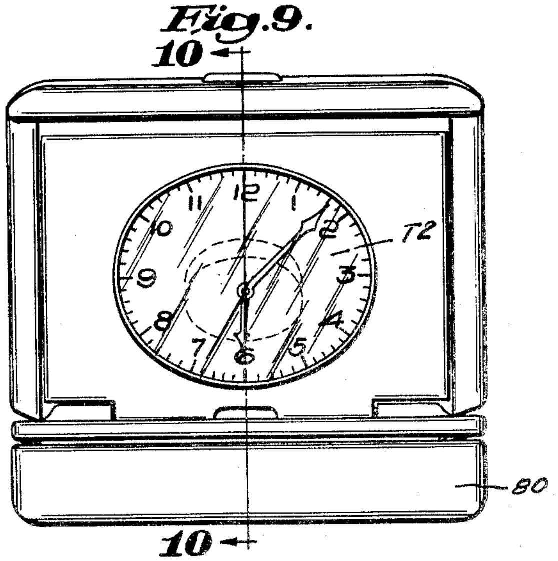
FIG. 9 is a front elevational view showing the clock projector apparatus of the invention combined with a travelling clock type of enclosure body.
Figure 10:
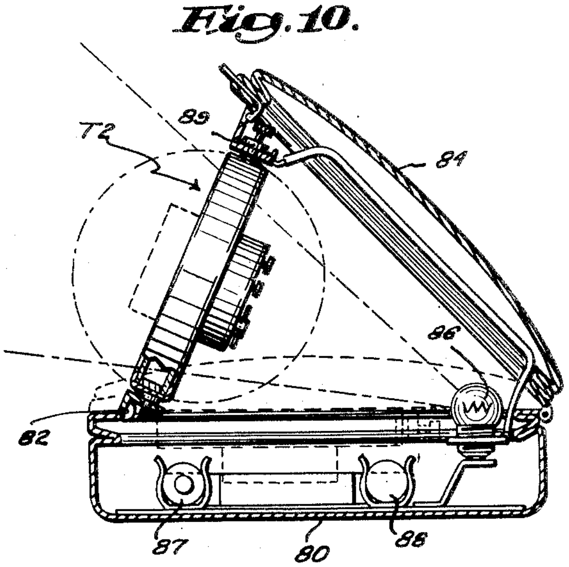
FIG. 10 is a cross section taken on the line 10—10 of FIG. 9.

In FIGS. 9 and 10, I have illustrated another arrangement of the travelling clock type in which a collapsible travelling case 80 is formed with a hollow base in which may be received a time indicating unit T2. The unit T2 is adapted to be supported in an inclined operation position as shown in FIG. 10. The time indicating unit T2 is hinged to the carrying case at 82 so that the unit when not in use may be dropped down into the case bottom and closed by means of a cover 84. The unit T2 generally corresponds to the dial construction shown and described in FIGS. 1 to 8 inclusive. A lamp 86 is energized by batteries 87 and 88 when a switch mechanism 89 is closed.

In FIGS. 11 and 12, I have illustrated still another form of the invention which is designed for use where it may be desired to reverse the position of the clock dial through rotative movement about a horizontal axis rather than about a vertical axis. I have found that projection of a clock image obtained by turning a dial about a horizontal axis must involve a modified form of dial construction in which two sets of dial figures and two sets of hands are required to be employed.

Considering the structure shown in FIGS. 11 and 12 more in detail, numeral 90 illustrates a dial of conventional nature with which hands 92 are adapted to register when moved by a clock movement 93. The dial 90 is further surrounded with a second annularly formed translucent dial 94. This second dial is provided with a second set of dial figures whose arrangement is in a reverse order as shown in FIG. 11, and in diagrammatically opposed relationship to respective dial figures of the dial 90. Also, the hands 92 are provided with translucent extension portions 95 and opaque tips 96.

It will be apparent that when this time indicating unit, which is denoted by the reference character T3, is supported in a suitable structure containing a light source, the inner dial may be utilized as a conventional clock by reading the figures thereon. However, by turning the unit T3 through an arc of 90°, as suggested in FIG. 12, so that the translucent dial face 94 is facing a source of light of the type earlier described, there will be projected directly upwardly an image of the clock reading of this annular dial portion 94. The arc of rotation is not necessarily limited to 90°. The amount of rotation is such that the translucent or transparent outer dial 94 is facing the lamp in whatever position the lamp may be, so that the image of the "12" numeral on the dial will appear at the top when viewed by the observer.

It is contemplated that a switching mechanism may be employed with this dial construction of FIGS. 11 and 12, corresponding to those switching arrangements already described. Also, the multiple dial form of the invention may be secured in various types of enclosure bodies such as bedside clocks, flashlights, radios, miner's head lamps, and various other lighting arrangements where a light projected image may be desired.

I may also utilize the clock projector with a radio receiver in a unique manner. It is contemplated that the clock mechanism may be supported in an angularly disposed position such that it is more convenient to look at by one lying in a bed. For this purpose one simple combination might comprise an angularly disposed unit such as that shown in FIGS. 3 and 4 above described, in which case the unit is energized by its own battery and secured or fitted to the top of the radio case in some desirable manner.

In another desirable form of radio clock projector means such as illustrated in FIGS. 13 to 16 inclusive, an electrically operated clock may be employed. In this latter case taps are taken from the transformer of the clock as suggested in FIG. 16 to provide a suitable source of current for lighting a small lamp L of the standard flashlight variety. The lamp L is preferably located in a recessed position below the top of a radio receiver 202. The lamp is preferably controlled by a switch 200 at the swiveling pivot extremity of the clock mounting as shown in FIG. 16 and as described in more detail with respect to other forms of the invention.

The electric clock 204 is mounted in an angularly disposed position, for example, as shown in FIGS. 13 and 14 on suitable brackets 206 and 208. In this position light is transmitted from the lamp L when energized through an opening formed in the top of the radio case to illuminate the clock dial. It will be seen that the clock is rotated about an axis through the 12 o'clock and 6 o'clock positions, and in the inclined position described, may be readily viewed by one lying in bed at either side of the radio set, assuming the latter is supported on a bedside stand. It will be understood that this feature of the clock is utilized when the room is lighted and the dial may be read as viewed in FIG. 13.

In darkness, however, the dial is rotated to face downward which lights the lamp L through the switch 200 and projects the dial image to the ceiling in the manner already described. In this particular arrangement, the dial is constructed to rotate through 360°. If desired, detent stops may be provided to position the dial at the desired locations.

In FIG. 15, a second radio receiver clock projector arrangement is shown. In this case the mounting of the clock is chosen to permit swivelling at the 3 o'clock and 9 o'clock positions. In this arrangement it will be observed that the clock 210 is mounted flush with an inclined surface 212 of a radio 214. In this case a rotor member 216 extends all the way through the housing with a knob at either end so that the clock may be rotated from either side of the radio. Here also, a suitable source of illumination and a switch responsive to rotative movement of the shaft provides for projecting the clock image on the ceiling to be viewed by one lying in bed.

While I have shown preferred embodiments of the invention, it will be understood that various other changes and modifications may be resorted to within the scope of the invention as defined in the appended claims. In this connection it is intended that any of the various dial projectors disclosed may be combined with alternating current or direct current arrangement in place of the battery type of light sources noted.

I claim:

1. A device for projecting a shadow image of a clock reading on a desired surface comprising in combination an enclosure body having an aperture formed at the upper side thereof, electrically operated lamp means mounted in the enclosure body in a position to emit light through the said aperture, a translucent clock dial pivotally supported in the enclosure body above the said aperture to transmit light, said dial having clock numerals located around the outer edge thereof, a clock mechanism secured to the underside of the dial and in spaced concentric relationship to the outer edge thereof to exclude transmission of light through the central portion of the dial and to define an outer annular light transmitting portion, means for turning the pivotally supported dial into a position in which the dial is facing the said aperture, and electrical switch means responsive to turning movement of the dial for energizing the lamp means and causing light transmitted through the said outer annular dial portion to form a shadow image of a clock reading on a surface.

2. A structure as defined in claim 1 in which the said numerals located around the outer edge of the dial occur in an inverted position and the clock mechanism includes a conventional clock dial having a second set of clock numerals for conventional clock reading, and said means for turning the specially supported dial being constructed and arranged to provide for moving the dial and clock mechanism throughout an arc of 180° and about an axis passing through the 3 o'clock position and the 9 o'clock position of the said inverted numerals.

3. A device for projecting a shadow image of a clock reading on a desired surface comprising in combination an enclosure body having an aperture formed in the upper side thereof, electrically operated lamp means mounted in the enclosure body in a position to emit light through the said aperture, a translucent clock dial pivotally supported on the enclosure body above the said aperture to transmit light, a clock mechanism secured to the underside of the dial, said clock mechanism occurring in spaced concentric relationship to the outer edge of the dial to exclude transmission of light through the central portion of the dial and to define an outer annular light transmitting portion, clock numerals arranged on a dial around the said outer edge, means for turning the pivotally supported dial about an axis passing through the 12 o'clock position and the 6 o'clock position and throughout an arc of 180° into a position in which the dial is facing the said aperture, and electrical switch means responsive to turning movement of the dial for energizing the lamp means and causing light transmitted from the aperture through the outer dial portion to form a shadow image of a clock reading on a surface.

References Cited in the file of this patent

UNITED STATES PATENTS

| | | |
|---|---|---|
| 740,433 | Hirth | Oct. 6, 1903 |
| 1,578,607 | Levy et al. | Mar. 30, 1926 |
| 1,645,633 | Wakefield | Oct. 18, 1927 |
| 2,243,759 | Maluo | May 27, 1941 |
| 2,358,422 | Springer | Sept. 19, 1944 |
| 2,694,338 | Moultry et al. | Nov. 16, 1954 |
| 2,726,571 | Chang | Dec. 13, 1955 |
| 2,834,250 | Stefani | May 13, 1958 |